United States Patent
Hudson et al.

(10) Patent No.: US 9,400,362 B2
(45) Date of Patent: Jul. 26, 2016

(54) FIBER OPTIC CABLE

(71) Applicant: Corning Optical Communications LLC, Hickory, NC (US)

(72) Inventors: H. Edward Hudson, Conover, NC (US); William Carl Hurley, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 15 days.

(21) Appl. No.: 14/324,809

(22) Filed: Jul. 7, 2014

(65) Prior Publication Data

US 2015/0016790 A1 Jan. 15, 2015

Related U.S. Application Data

(60) Provisional application No. 61/845,539, filed on Jul. 12, 2013.

(51) Int. Cl.
*G02B 6/44* (2006.01)
*B29D 11/00* (2006.01)

(52) U.S. Cl.
CPC ........ *G02B 6/4434* (2013.01); *B29D 11/00701* (2013.01); *G02B 6/4432* (2013.01); *G02B 6/4401* (2013.01); *G02B 6/443* (2013.01)

(58) Field of Classification Search
CPC .... G02B 6/443; G02B 6/4401; G02B 6/4432; G02B 6/4433; G02B 6/4434

USPC .......................................... 385/100–114, 117
See application file for complete search history.

(56) References Cited

U.S. PATENT DOCUMENTS

| | | | | |
|---|---|---|---|---|
| 4,515,435 | A | 5/1985 | Anderson | 350/96.23 |
| 5,542,020 | A * | 7/1996 | Horska | 385/112 |
| 6,487,346 | B2 * | 11/2002 | Nothofer | 385/109 |
| 7,113,680 | B2 * | 9/2006 | Hurley et al. | 385/113 |
| 8,175,434 | B2 * | 5/2012 | Davidson et al. | 385/113 |
| 2002/0009272 | A1 * | 1/2002 | Parris | G02B 6/4492 385/109 |
| 2012/0082422 | A1 * | 4/2012 | Sarchi | G01K 11/32 385/101 |
| 2012/0099825 | A1 * | 4/2012 | Messer | G02B 6/4432 385/113 |

FOREIGN PATENT DOCUMENTS

| | | | | |
|---|---|---|---|---|
| CN | 101840044 A | 9/2010 | | G02B 6/44 |
| CN | 102331610 A | 1/2012 | | G02B 6/44 |
| CN | 202383331 U | 8/2012 | | G02B 6/44 |
| CN | 202421578 U | 9/2012 | | G02B 6/44 |
| JP | 2000-321472 A | 11/2000 | | G02B 6/44 |

* cited by examiner

*Primary Examiner* — Kaveh C Kianni
*Assistant Examiner* — Hung Lam
(74) *Attorney, Agent, or Firm* — William D. Doyle

(57) ABSTRACT

A cable includes a jacket defining an exterior of the cable and a rigid tube. The cable further includes densely-packed strength members on the outside of the rigid tube, compressed between the rigid tube and the jacket, and loosely-packed strength members on the inside of the rigid tube. Further the cable includes a core that is interior to the tube.

19 Claims, 1 Drawing Sheet

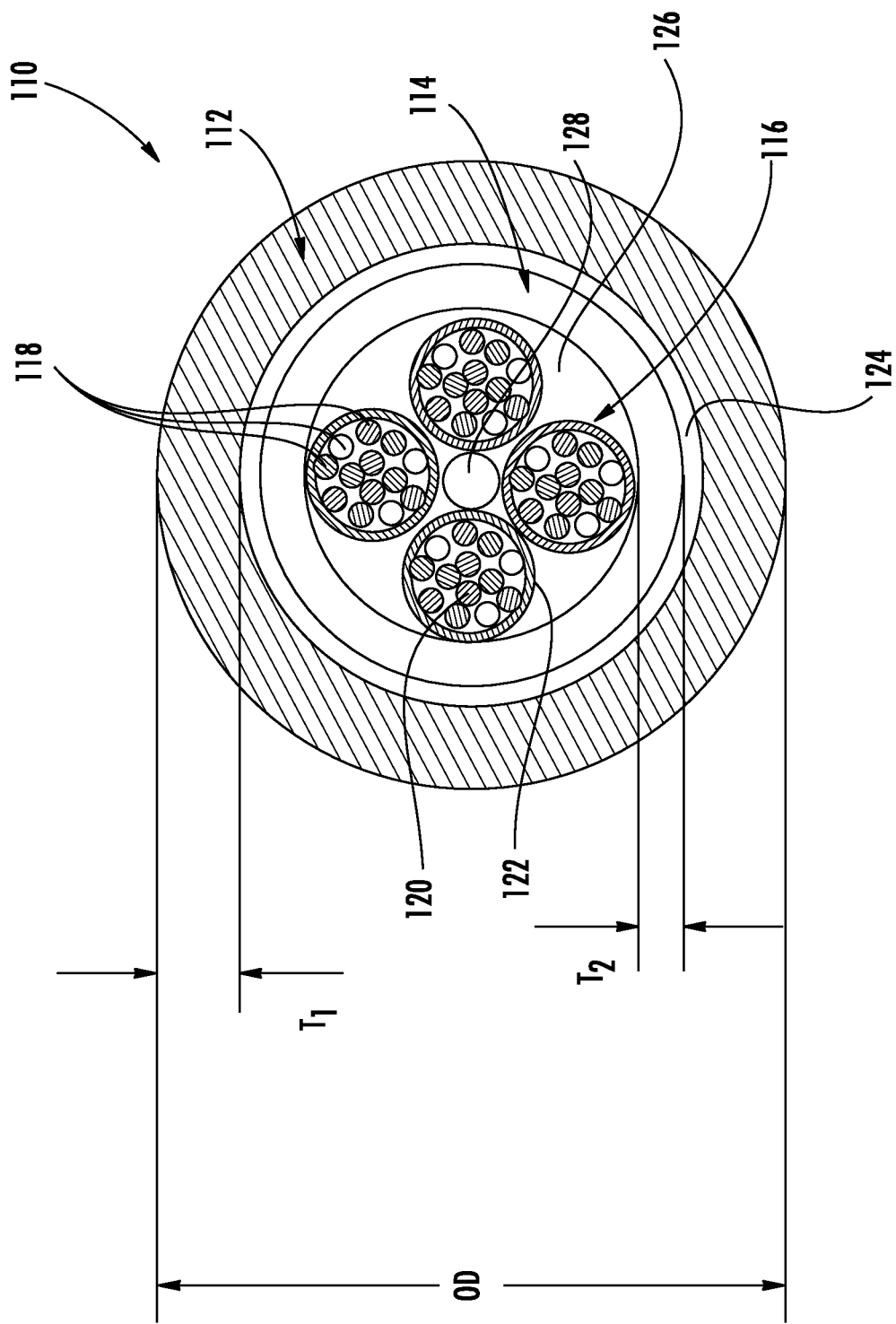

FIBER OPTIC CABLE

PRIORITY APPLICATION

This Application claims the benefit of priority under 35 U.S.C. §119 of U.S. Application Ser. No. 61/845,539 filed on Jul. 12, 2013, the content of which is relied upon and incorporated herein by reference in its entirety.

BACKGROUND

Aspects of the present disclosure relate generally to fiber optic cables.

In some applications, coupling between one or more optical fibers of a fiber optic cable and the jacket of the cable may increase attenuation of the optical fibers as the jacket is handled. A need exists for a fiber optic cable designed to allow for heavy handling, while mitigating attenuation impact of the handling on the optical fibers.

SUMMARY

One embodiment relates to a fiber optic cable, which includes a jacket defining an exterior of the cable and a rigid tube. The cable further includes densely-packed strength members on the outside of the rigid tube, compressed between the rigid tube and the jacket, and loosely-packed strength members on the inside of the rigid tube. Further the cable includes an optical core that is interior to the tube. The optical core may include micromodules stranded around a central strength member, where each micromodule includes a sheath surrounding optical fibers. Applicants believe the densely-packed strength members facilitate mechanical coupling of the rigid tube to the jacket, providing for a rugged cable, while the loosely-packed strength members facilitate decoupling of the optical core from the rigid tube.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which:

FIG. 1 is a cross-sectional view of a fiber optic cable according to an exemplary embodiment.

DETAILED DESCRIPTION

Before turning to the Figures, which illustrate exemplary embodiments now described in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Referring to FIG. 1, a fiber optic cable 110 includes a jacket 112, a rigid tube 114, and an optical core 116 including at least one optical fiber 118. The cable 110 includes densely-packed strength members 124 between the jacket 112 and the rigid tube 114, and loosely-packed strength members 126 interior to the rigid tube 114. According to an exemplary embodiment, the loosely-packed strength members 126 are positioned within the rigid tube 114, but exterior to components therein, such as micromodules or buffer tubes containing optical fibers, separating the strength members 126 therefrom. For example, the loosely-packed strength members 126 may fill interstitial spaces between micromodules or buffer tubes within the rigid tube 114.

According to an exemplary embodiment, the jacket 112 is primarily formed from a tough yet flexible (stretchable) material, such as thermoplastic urethane to provide durability to the fiber optic cable 110, where thermoplastic urethane is the major constituent, but other materials may be added such as fillers, additives, etc. In some embodiments, the jacket 112 is primarily formed from polyethylene, polyvinyl chloride, or other materials.

According to an exemplary embodiment, the rigid tube 114 is primarily formed from a rigid form of polyvinyl chloride. In some such embodiments, the rigid tube 114 is substantially more rigid than the jacket 112, such as at least twice as rigid in terms of Shore D hardness. In some embodiments, the rigid tube 114 has a Shore D hardness of at least 65. In other embodiments, the rigid tube 114 may be formed from a high-density polyethylene, polypropylene or another material. The tube 114 may have a Shore D hardness of less than 65.

According to an exemplary embodiment, the rigid tube 114 forms a hard backstop to compress the strength members 124 between the jacket 112 and the rigid tube 114. In some embodiments, the jacket 112 is pressure extruded around the strength members 124 such that the strength members 124 partially embed or form grooves into the interior of the jacket 112, gripping and interlocking the densely-packed strength members 124 and jacket 112. In some embodiments, the jacket 112 contracts upon cooling, following extrusion, to compress the strength members 124 between the interior of the jacket 112 and the exterior of the tube 114.

According to an exemplary embodiment, the loosely-packed strength members 126 interior to the tube 114 are substantially less packed than those exterior to the tube 114, such as filling a volume of space that is at least twice as large for a given quantity of strength members. In some embodiments, both the densely-packed strength members 124 and the loosely-packed strength members 126 are tensile yarns, such as including aramid yarns, fiberglass yarns, or other yarns. By "yarns," Applicants mean a plurality of individual filaments. The aramid yarns may be at least 1500 denier, such as at least 2000 denier. In some embodiments, the densely-packed strength members 124 include at least twice as many strength members as the loosely-packed strength members 126, such as in a ratio of at least 2:1, such as at least 2.5:1.

Accordingly, the jacket 112 and tube 114 may be rigidly coupled together by way of the densely-packed strength members 124. Handling of the jacket 112, such as stretching, compressing, and/or bending of the jacket 112 correspondingly handles the tube 114. By contrast, the loosely-packed strength members 126 may decouple the optical core 116 from the interior of the tube 114. Instead, the loose packing allows optical core 116 to slide on the strength members 126 in the tube 114, and to move relative to the tube 114 and jacket 112. As such, the optical core 116 is able to slide and flex to lower stress positions within the tube 114, mitigating effects of attenuation on the one or more optical fibers 118 of the optical core 116.

In some embodiments, the optical core 116 includes micromodules 120, such as at least four micromodules 120, where the micromodules 120 include a sheath 122 surrounding optical fibers 118. The sheath 122 may be particularly thin-walled, having a wall thickness of less than 200 micrometers, such as less than 150 micrometers. The sheath 122 may surround at least four optical fibers 118, such as at least eight optical fibers 118, such as at least twelve optical fibers 118. According to an exemplary embodiment, the sheaths 122 are generally round and have a cross-section (as shown in FIG. 1) with an outer diameter of less than 2 millimeters, such as less than 1.5 millimeters.

In some embodiments, the micromodules 120 may be stranded, such as helically wound or S-Z stranded, around a central strength member 128. In some embodiments, the micromodules 120 are stranded about the central strength member 128 in an S-Z pattern where pitch is such that the average lengthwise distance of a rotation of the micromodules 120 around central strength member 128 is less than 150 millimeters, such as less than 120 millimeters. The average lengthwise distance can be generally determined by dividing the lengthwise distance between reversal points by the number of wraps around the central strength member 128 between reversal points, where the number of wraps may include a fraction of a full wrap. In other embodiments, the micromodules may be helically stranded around the central strength member (i.e., wound in one direction) and may include an average lay length of the helical strand of less than 300 millimeters, such as less than 250 millimeters, and/or less than 200 millimeters.

In some embodiments, the optical fibers 118 of the cable 110 may have a particularly long excess fiber length, the length of the optical fibers 118 relative to the length of the surrounding body, such as the micromodule sheath 122. For example, the excess fiber length may be at least 0.3%, such as at least 0.33%, and/or even 0.35% when the surrounding body is at zero strain. Excess fiber length allows the optical fibers 118 to stretch out while the surrounding body is in tensile strain without substantially tensioning the optical fibers 118 until the excess fiber length is pulled out.

In some embodiments, the micromodules 120 may also or alternatively be bound to the central strength member 128 with binders, such as counter-helically wound binder yarns, a thin-film binder, glue on the central strength member 128 or another form of binder. Stranding the micromodules 120 and/or binding them to the central strength member 128 may couple optical fibers 118 of the micromodules 120 to one another, such that optical fibers 118 may not be easily displaced relative to one another, thereby providing a generally consistent length of the optical fibers 118 throughout the fiber optic cable 110 and mitigating skew.

According to an exemplary embodiment, the central strength member 128 is not rigid and/or a stiff rod, such as instead being only semi-rigid. In some embodiments, the central strength member 128 is formed from tensile yarns tacked together, such as with a wax or other binding agent, such as a non-cross-linking polymer. The tacking distinguishes the tensile yarns of the central strength member 128 from those of exterior to the center, such as surrounding the core 116. However, in some such embodiments, neither the non-central nor the central strength members 124, 126, 128 are rigid in bending such that, at sea level, a 50 millimeter length of either the non-central or the central strength members 124, 126, 128, cantilevered horizontally and fixed only on one end, bends to an angle of at least 30-degrees on the other end thereof due to its own weight, such as at least 45-degrees, and/or even 60-degrees. Providing a non- or semi-rigid central strength member 128 is intended to increase the bending flexibility of the cable 110 but may be counter-intuitive to some cable designers due to decreased resistance to compressive loading a buckling in some applications. In other embodiments, the central strength member 128 is rigid, such as formed from a steel rod, a glass-reinforced plastic rod, or another such element.

In some embodiments, the outer diameter OD of the cable 110 is particularly small, such as less than 10 millimeters, such as less than 8 millimeters, yet the cable 110 includes at least four micromodules 120, each micromodule 120 containing at least twelve optical fibers 118, thereby providing a dense fiber optic cable 110. In some embodiments, the jacket 112 of the cable 110 is substantially thicker than the rigid tube 114, such as having a thickness of between 0.75 and 1.5 millimeters, while the rigid tube 114 has a thickness of less than 0.75 millimeters but at least 0.25 millimeters.

In at least some contemplated embodiments, loosely-packed strength members interior to the rigid tube 114 may be unnecessary, and are not included. In such a cable, the rigid tube 114 and central strength member 128 provide sufficient strength to the cable interior to the densely-packed strength members 124 and jacket 112.

In at least some other contemplated embodiments, a cable may include only features of the cable 110 that are interior to the densely-packed strength members 124 shown in FIG. 1, where the rigid tube 114 serves as the jacket defining the exterior of such a cable. The tube 114 may have the dimensions of the jacket 112, disclosed above, but reduced by 0.5 millimeters. In some such cables, the central strength member 128 may be formed from tacked tensile yarns, such as bundled aramid yarns. Accordingly, in some such embodiments, the core 116 may be surrounded by loosely-packed strength members 126 as disclosed herein. In other such embodiments, the non-central strength members 126 interior to the tube 114 (i.e., the jacket in such embodiments) are densely packed, and the tube 114 is pressure extruded thereon to compress the strength members 126 and at least partially embed the strength members 126 in the tube 114 wall, as disclosed above for the jacket 112. Such a cable, possibly in combination with the short lay lengths disclosed above, may facilitate coupling together of the optical fibers 118, the strength members 126 (e.g., aramid), and the tube 114 (i.e., jacket in such embodiments) to reduce optical fiber 118 movement relative to one another and/or the rest of the cable at the furcation or connection point, such as when a tensile load is applied to the cable. Thus, reliability of corresponding cable assemblies is improved.

In embodiments disclosed above, the cable 110 allows for less than 2 millimeters fiber movement, along the length of the cable 110, from a furcated end of the cable 110 or an access location along the length of the cable 110, which is due at least in part to the coupling and decoupling features disclosed above. Such little fiber movement may be particularly beneficial to connectorized ends of the cable 110 and/or hardware mounted to the cable 110 by reducing stresses on the optical fibers 118 at the connections that may otherwise result in increased attenuation or signal losses. This value of less than 2 millimeters is for tensile loading on the cable 110, such as due to hauling, that is less than a maximum tensile load on the cable 110, such as 200 pounds-force, 400 pounds-force, or even 500 pounds-force.

Due at least in part to the coupling and decoupling features disclosed herein and/or the non-rigid central strength member, the cable 110 has a bend radius of less than 300 millimeters, such as less than 250 millimeters or even 200 millimeters, without increasing attenuation by more than 100% at 850 nanometers wavelength and/or 1350 nanometers wavelength, facilitating operation of the cable 110 when bending at relatively tight angles. Further, concerning bending, the cable, in a kink test performed according to IEC 60794-1-2-E10, has a kink diameter of less than 150 millimeters, such as less than 125 millimeters, and/or even less than 100 millimeters, facilitating handing of the cable 110 via bending through particularly tight angles for such a cable 110.

The construction and arrangements of the fiber optic cable 110, as provided in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic cable, comprising:
a jacket defining an exterior of the cable;
a rigid tube, wherein the rigidity of the tube is greater than that of the jacket;
densely-packed strength members on the outside of the rigid tube, compressed between the rigid tube and the jacket,
loosely-packed strength members on the inside of the rigid tube; and
an optical core that is interior to the tube, wherein the optical core comprises at least one optical fiber, and
wherein the optical core comprises micromodules and a central strength member, wherein each micromodule comprises a sheath surrounding optical fibers and the micromodules are stranded around the core in an S-Z pattern where pitch is such that an average lengthwise distance of a rotation of the micromodules around the central strength member is less than 150 millimeters.

2. The cable of claim 1, wherein the rigid tube is formed from a material primarily consisting of rigid form of polyvinyl chloride.

3. The cable of claim 2, wherein the material of the rigid tube has a Shore D hardness of at least 65.

4. The cable of claim 2, wherein the jacket is formed from thermoplastic urethane.

5. The cable of claim 1, wherein the rigidity of the rigid tube is at least twice that of the jacket, wherein the number of densely-packed strength members is at least twice the number of loosely-packed strength members.

6. The cable of claim 1, wherein the loosely- and densely-packed strength members comprise tensile yarns, wherein the densely-packed strength members are located between an inner surface of the jacket and an outer surface of the rigid tube, wherein the densely-packed strength members contact the inner surface of the jacket.

7. The cable of claim 6, wherein the loosely- and densely-packed strength members comprise aramid yarns.

8. The cable of claim 1, wherein the jacket is thicker than the rigid tube.

9. The cable of claim 8, wherein the jacket is between 1.5 and 2.5 times thicker than the rigid tube.

10. The cable of claim 1, wherein the jacket and rigid tube are round in cross-section and the outer diameter of the tube is more than half of the outer diameter of the jacket.

11. A method of manufacturing the cable of claim 1, comprising a step of pressure extruding the jacket to compress the densely-packed strength members between the interior of the jacket and exterior of the rigid tube.

12. The method further of claim 11, wherein the optical core comprises micromodules and a central strength member, wherein each micromodule comprises a sheath surrounding optical fibers, wherein the method further comprises stranding the micromodules around the core in an S-Z pattern where pitch is such that an average lengthwise distance of a rotation of the micromodules around the central strength member is less than 150 millimeters.

13. A fiber optic cable, comprising:
a jacket defining an exterior of the cable;
a rigid tube, wherein the rigidity of the tube is greater than that of the jacket;
densely-packed strength members on the outside of the rigid tube, compressed between the rigid tube and the jacket,
loosely-packed strength members on the inside of the rigid tube; and
an optical core that is interior to the tube, wherein the optical core comprises micromodules stranded around a central strength member, wherein each micromodule comprises a sheath surrounding optical fibers, and
wherein the jacket and the rigid tube are round in cross-section and the outer diameter of the tube is more than half of the outer diameter of the jacket, wherein the number of densely-packed strength members is at least twice the number of loosely-packed strength members, wherein the densely-packed strength members are located between an inner surface of the jacket and an outer surface of the tube, wherein the densely-packed strength members contact the inner surface of the jacket such that the densely-packed strength members partially embed into the inner surface of the jacket.

14. The cable of claim 13, wherein the central strength member comprises the same material as the densely- and loosely-packed strength members.

15. The cable of claim 13, wherein the micromodules are stranded about the central strength member in an S-Z pattern where pitch is such that the average lengthwise distance of a rotation of the micromodules around central strength member is less than 150 millimeters.

16. The cable of claim 15, wherein the average lengthwise distance of a rotation of the micromodules around central strength member is less than 120 millimeters.

17. The cable of claim 13, wherein the jacket is thicker than the rigid tube.

18. The cable of claim 17, wherein the jacket is between 1.5 and 2.5 times thicker than the rigid tube.

19. A fiber optic cable, comprising:
a jacket defining an exterior of the cable;
non-central strength members interior to the jacket, wherein the non-central strength members are formed from tensile yarns,
a central strength member, wherein the central strength member is formed from more tensile yarns, wherein the more tensile yarns of the central strength member are tacked together while the tensile yarns of the non-central strength members are independent of one another such that at least some tensile yarns of the non-central strength members are not tacked to other tensile yarns of the non-central strength members, and wherein neither the non-central nor the central strength members are rigid in bending such that at sea level a 50 millimeter length of either the non-central or the central strength members, cantilevered horizontally and fixed only on one end, bends to an angle of at least 30-degrees on the other end thereof due to its own weight; and an optical core that is interior to the jacket, wherein the optical core comprises micromodules stranded around the central strength member, wherein each micromodule comprises a sheath surrounding optical fibers, and
wherein the micromodules are stranded about the central strength member in an S-Z pattern where pitch is such that an average lengthwise distance of a rotation of the micromodules around central strength member is less than 150 millimeters.

* * * * *